United States Patent [19]
Pajakowski

[11] Patent Number: 5,906,406
[45] Date of Patent: May 25, 1999

[54] FUEL FILLER POCKET ASSEMBLY

[75] Inventor: Mark E Pajakowski, Clinton Township, Mich.

[73] Assignee: General Motors Corporation, Detroit, Mich.

[21] Appl. No.: 08/882,617

[22] Filed: Jun. 25, 1997

[51] Int. Cl.⁶ .................................................. B60R 27/00
[52] U.S. Cl. ...................... 296/97.22; 280/834; 220/86.2
[58] Field of Search ........................ 296/97.22; 220/86.2, 220/DIG. 33; 280/834

[56] References Cited

U.S. PATENT DOCUMENTS

| | | | |
|---|---|---|---|
| 4,782,978 | 11/1988 | Appleby et al. | 220/DIG. 33 |
| 5,090,760 | 2/1992 | Wheeler | 296/97.22 X |
| 5,664,811 | 9/1997 | Martus et al. | 296/97.22 X |

FOREIGN PATENT DOCUMENTS

| | | | |
|---|---|---|---|
| 99418 | 6/1982 | Japan | 296/97.22 |

*Primary Examiner*—Joseph D. Pape
*Attorney, Agent, or Firm*—Kathryn A. Marra

[57] ABSTRACT

A fuel filler pocket assembly includes a fuel filler pocket in a vehicle. The vehicle includes a fuel cover door for covering the fuel filler pocket. The fuel filler pocket includes a first fuel filler pocket portion and a second fuel filler pocket portion for attachment to the vehicle. The second fuel filler pocket portion is formed separate and independent from the first fuel filler pocket portion. The first fuel filler pocket portion is attachable to the second fuel filler pocket portion to provide the fuel filler pocket and a fuel door release cable is attached to the second fuel filler pocket portion. Preferably, the first fuel filler pocket portion forms a major portion of the fuel filler pocket and the second fuel filler pocket portion forms a minor portion of the fuel filler pocket.

13 Claims, 4 Drawing Sheets

FUEL FILLER POCKET ASSEMBLY

TECHNICAL FIELD

This invention relates to a fuel filler pocket assembly for use in a motor vehicle.

BACKGROUND OF THE INVENTION

It is well known in the prior art to provide a fuel filler pocket which surrounds a fuel filler neck and is closed by a fuel cover door. A fuel filler cap may be removed from the fuel filler neck and gasoline may be inserted into the fuel filler neck by a gasoline pump nozzle. The fuel filler pocket provides a housing for the fuel filler neck and also provides structure to which the fuel filler neck is attached. It is known to provide a fuel filler pocket which is an integral cup-shaped piece connected to the vehicle body sheet metal. The fuel filler pocket also typically serves the purpose of capturing and draining any fuel spillage around the filler neck.

It is also known in the prior art to provide the fuel cover door which is also mounted to the vehicle sheet metal and which is movable between a closed condition covering the fuel filler pocket and the fuel filler neck and an open condition in which the fuel filler neck is accessible. As is well known in the art, the fuel cover door may be electronically released and opened by a remote button located in the passenger compartment of the vehicle which depresses a plunger mounted on the fuel filler pocket to release the fuel cover door. However, if the electrical release should function improperly, it is also known that the fuel cover door may be opened mechanically by a back-up fuel cover door release cable typically located in the rear compartment of the vehicle. The release cable may be manually pulled to depress the plunger and release and open the fuel cover door, as is also well known in the art.

However, one of the shortcomings of this arrangement is the accessibility of the release cable and the plunger during assembly. The fuel filler pocket is a single component mounted to the vehicle body sheet metal. The release cable extends between the rear compartment and the fuel filler pocket. The plunger is attached to the end of the release cable. To assemble the plunger to the fuel filler pocket, the plunger and the release cable must be fished out from between the inner and outer body sheet metal and attached to the fuel filler pocket which is already mounted on the vehicle. The plunger end of the release cable can then be attached to the small plunger hole in the fuel filler pocket. However, accomplishing this attachment requires one operator on the inside of the vehicle or underneath the vehicle who fishes the release cable through the inner and outer sheet metal body panels and inserts the plunger into the plunger hole from behind the fuel filler pocket while a second operator stands outside the vehicle and places the nut on the plunger from the inside of the pocket to attach the plunger and release cable to the fuel filler pocket.

In light of the difficulty in assembling the release cable to the fuel filler pocket, many vehicles continue to have the traditional fuel cover doors which are manually flipped open, instead of remotely released.

SUMMARY OF THE INVENTION

The present invention provides alternative and advantages over the prior art by providing a fuel filler pocket assembly which is much easier to assemble than those of the prior art. The present invention provides for ease of attachment of the mechanical release cable to the fuel filler pocket. Advantageously, the fuel filler pocket is preferably provided in two pieces such that the release cable can be attached to one of the pieces, preferably prior to vehicle assembly, and the other of the pieces can be easily attached to the piece attached to the release cable without the use of fasteners.

These advantages are accomplished by providing a fuel filler pocket assembly including a fuel filler pocket in a vehicle. The vehicle includes a fuel cover door for covering the fuel filler pocket. The fuel filler pocket includes a first fuel filler pocket portion and a second fuel filler pocket portion for attachment to the vehicle. The second fuel filler pocket portion is formed separate and independent from the first fuel filler pocket portion. The first fuel filler pocket portion is attachable to the second fuel filler pocket portion to provide the fuel filler pocket and a fuel door release cable is attached to the second fuel filler pocket portion. Preferably, the first fuel filler pocket portion forms a major portion of the fuel filler pocket and the second fuel filler pocket portion forms a minor portion of the fuel filler pocket.

In accordance with further aspects of the invention, the first fuel filler pocket portion includes a pocket gap portion and the second fuel filler pocket portion is sized and shaped for substantially filling the pocket gap portion when the first fuel filler pocket portion is attached to the second fuel filler pocket portion. Also preferably, the first and second fuel filler pocket portions each include mating features for interconnecting the first fuel filler pocket portion to the second fuel filler pocket portion. Preferably, one of the mating features is an enlarged edge portion and another of the mating features is a channel which is sized and shaped for slidably receiving the enlarged edge portion therein to interconnect the first and second fuel filler pocket portions. Also, the mating features may consist of an upstanding finger and an aperture to interconnect the first and second fuel filler pocket portions.

In accordance with an embodiment of the invention, a fuel filler pocket assembly includes a first fuel filler pocket portion and a fuel door release cable assembly including a release cable and a second fuel filler pocket portion. The release cable is connected to the second fuel filler pocket portion and the second fuel filler pocket portion is attachable to the vehicle body. The first fuel filler pocket portion is attachable to the second fuel filler pocket portion and to the vehicle body such that interconnection of the first and second fuel filler pocket portions provides a fuel filler pocket.

The invention also provides for ease of assembly of the fuel filler pocket assembly including the steps of providing a first fuel filler pocket portion and providing a release cable assembly including a release cable connected to a second fuel filler pocket portion. Then the second fuel filler pocket portion is attached to the vehicle body and the first fuel filler pocket portion is attached to the second fuel filler pocket portion. Preferably, the first fuel filler pocket portion is attached to the vehicle body after attaching the first fuel filler pocket portion to the second fuel filler pocket portion. By providing a two-piece fuel filler pocket which includes a minor portion attached to the release cable, the accessibility and ease of assembly is greatly improved.

DESCRIPTION OF THE PREFERRED EMBODIMENT

Figure 1:
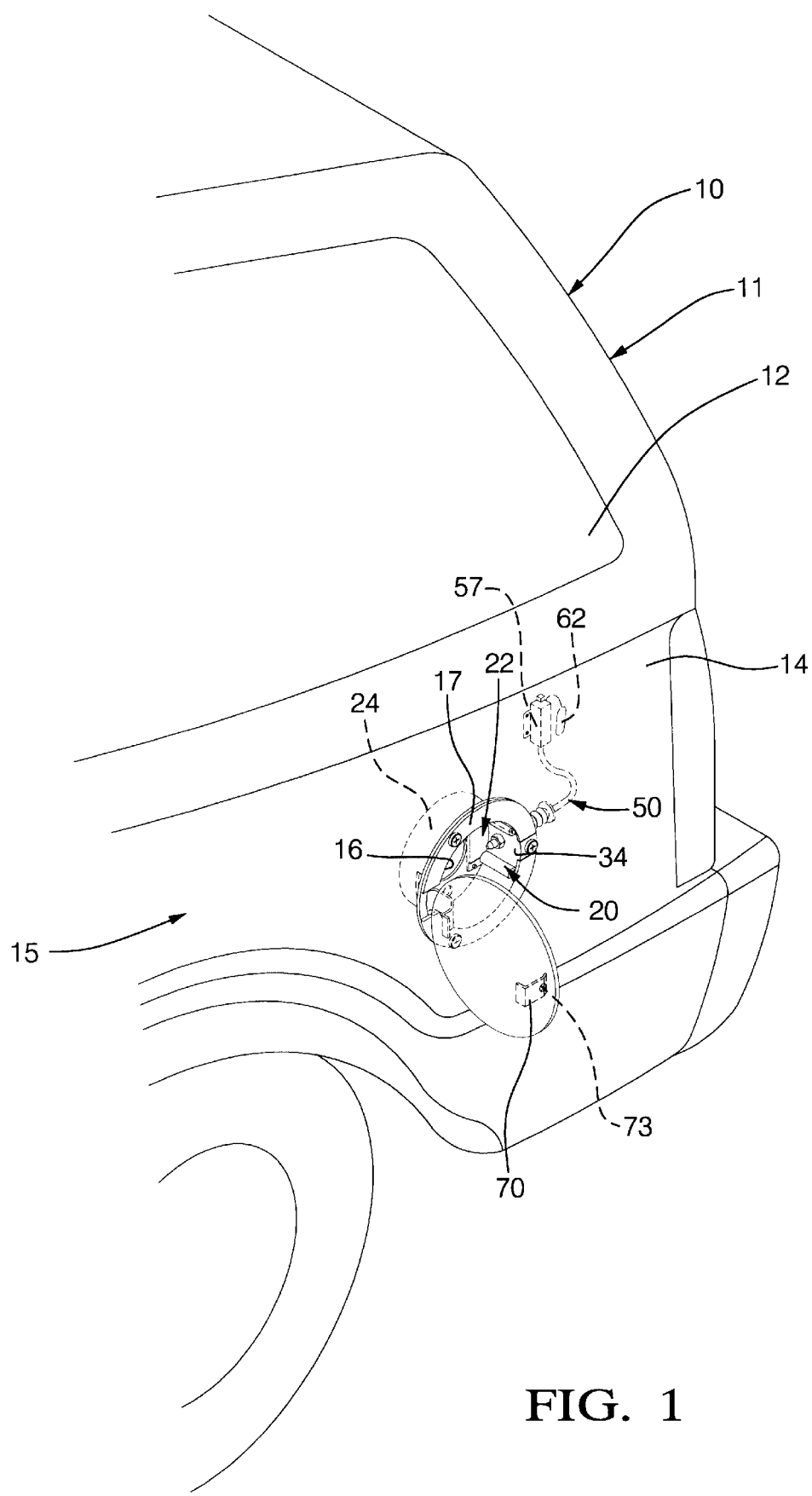
FIG. 1 is a perspective view of a vehicle showing a fuel filler pocket assembly according to the present invention.

Referring to FIG. 1, a vehicle 10 includes a rearward portion 11 having a rearward interior compartment 12. The vehicle 10 further includes a rear quarter panel 14 including vehicle body structure 15, preferably being formed of stamped sheet metal. Referring to FIGS. 1–4, the vehicle 10 further includes a fuel filler pocket assembly 20 including a fuel filler pocket 22 having a first fuel filler pocket portion 24 and a second fuel filler pocket portion 34 and a release cable assembly 50 including a release cable 52 attached to the second fuel filler pocket portion 34, as described further hereinafter. The vehicle body structure 15 includes an access opening 16 which is preferably surrounded by a body flange portion 17 for reinforcement of the access opening 16. The body flange portion 17 surrounding the access opening 16 also preferably includes body apertures 18 through which fasteners 30 may be inserted to attach the fuel filler pocket 22 to the vehicle body structure 15, as described further hereinafter. The body flange portion 17 may also include reinforcement tabs 75 through which each of the body apertures 18 also extend. The body flange portion 17 provides a mounting surface on the vehicle body structure 15 to which the fuel filler pocket 22 is mounted, as described further hereinafter.

The vehicle 10 also includes a fuel cover door 70 which is pivotally mounted to the vehicle body structure 15 by a hinge portion 72. The fuel cover door 70 further includes a hook portion 73 having a hook aperture 74 which is sized for capturing a plunger mechanism 54 of the release cable assembly 50 therein to hold the fuel cover door 70 in the closed condition when fuel is not being delivered to the vehicle 10. When it is desired to load fuel into the vehicle 10, the plunger mechanism 54 may be depressed to release the fuel cover door 70 and permit the fuel cover door 70 to pivot about the hinge portion 72 to the open condition as shown in FIGS. 1–4. It will be appreciated that the hinge portion 72 is preferably spring loaded such that the fuel cover door 70 pops open when released. When the fuel cover door 70 is in the open condition, a fuel cap (not shown) may be removed from a fuel filler neck (not shown) such that fuel may be delivered into the fuel filler neck by a gasoline pump nozzle as is well known in motor vehicles.

The fuel filler pocket assembly 20 also includes the first fuel filler pocket portion 24 of the fuel filler pocket 22 which is generally cup-shaped and preferably formed from a generally rigid material, such as a rigid plastic or metal, for providing support structure onto which the fuel filler neck can be mounted. The first fuel filler pocket portion 24 includes a side wall 26 which is preferably generally cylindrical and a bottom wall 27 having edges engaging a bottom end of the side wall 26. A pocket flange portion 28 extends outwardly around the circumference of an upper end of the side wall 26 and includes pocket flange apertures 29. The pocket flange apertures 29 are spaced for alignment with corresponding body apertures 18 for attachment of the first fuel filler pocket portion 24 to the vehicle body structure 15, as described further hereinafter.

Figure 2:
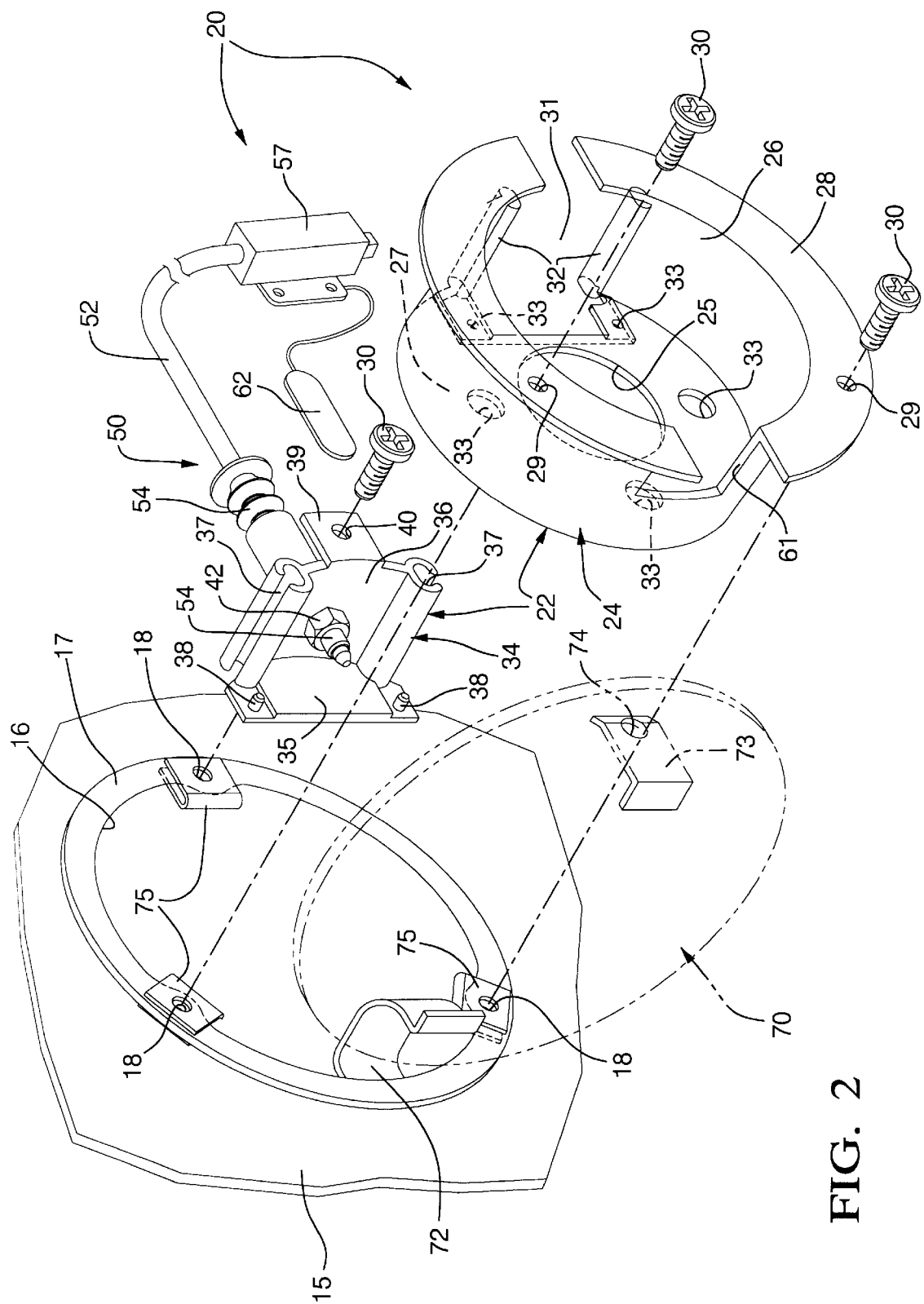
FIG. 2 is an exploded perspective view of the fuel filler pocket assembly with the vehicle body broken away.

The first fuel filler pocket portion 24 further includes an opening being a pocket gap portion 31 which is sized and shaped for receipt of the second fuel filler pocket portion 34 to fill the pocket gap portion 31 to complete the fuel filler pocket 22. The pocket gap portion 31 preferably extends through the side wall 26, the pocket flange portion 28, and partially through the bottom wall 27, as best shown in FIG. 2. The side wall 26 includes longitudinally extending enlarged edge portions 32 located on opposing sides of the pocket gap portion 31. The enlarged edge portions 32 provide a side wall mating feature for attachment of the second fuel filler pocket portion 34 to the first fuel filler pocket portion 24 without the use of fasteners, as described further hereinafter. The bottom wall 27 of the first fuel filler pocket portion 24 also includes bottom wall apertures 33 which provide a snap-fit mating feature on the bottom wall 27 for additional securement of the first fuel filler pocket portion 24 to the second fuel filler pocket portion 34, preferably without the use of fasteners.

The bottom wall 27 further includes a central filler neck opening 25 for receiving the fuel filler neck therethrough for attachment of the fuel filler neck to the first fuel filler pocket portion 24 via fasteners (not shown) extending through filler neck apertures 60 also located on the bottom wall 27 and spaced around the filler neck opening 25. The first fuel filler pocket portion 24 also preferably includes a hinge gap 61 which provides a circumferential opening in the side wall 26 and the pocket flange portion 28 at a location generally opposite the pocket gap portion 31. The hinge gap 61 provides a space for the hinge portion 72 of the fuel cover door 70 to be seated and freely pivot when the fuel cover door 70 is opened and closed.

The fuel filler pocket assembly 20 also includes a release cable assembly 50 comprised of the release cable 52 including the plunger mechanism 54 and the second fuel filler pocket portion 34. The second fuel filler pocket portion 34 is sized and shaped for matably engaging and filling the pocket gap portion 31 in the first fuel filler pocket portion 24 to provide the complete fuel filler pocket 22. The fuel filler pocket 22 comprised of the interconnected first fuel filler pocket portion 24 and the second fuel filler pocket portion 34 cooperatively provides a housing for the fuel filler neck and structure to which the fuel filler neck is mounted.

The second fuel filler pocket portion 34 is preferably substantially smaller than the first fuel filler pocket portion 24 such that the first fuel filler pocket portion 24 forms a major part of the fuel filler pocket 22 and the second fuel filler pocket portion 34 forms a minor part of the fuel filler pocket 22. The second fuel filler pocket portion 34 has a complementary shape for filling the pocket gap portion 31 and is preferably slightly oversized from the pocket gap portion 31 to provide overlap with the first fuel filler pocket portion 24 for mating and interconnecting therewith. The second fuel filler pocket portion 34 preferably includes a bottom wall portion 35 which is shaped for matably engaging the bottom wall 27 of the first fuel filler pocket portion 24. The second fuel filler pocket portion 34 also includes a side wall portion 36 which is sized and shaped for matably engaging the side wall 26 of the first fuel filler pocket portion 24. Thus, the side wall portion 36 is curved in a manner corresponding with the side wall 26 of the first fuel filler pocket portion 24 to form a smooth continuation thereof when connected thereto. The second fuel filler pocket portion 34 is generally sized and shaped for filling the gap pocket portion 31 such that the first fuel filler pocket portion 24 and the second fuel filler pocket portion 34 cooperatively provide the fuel filler pocket 22. The side wall portion 36 of the second fuel filler pocket portion 34 includes vertically extending channels 37 which provide the side wall mating feature for mating with the side wall mating feature on the side wall 26 of the first fuel filler pocket portion 24 being the enlarged edge portions 32. The channels 37 are sized and shaped for receiving the enlarged edge portions 32 therein by slip-fitted engagement to interconnect the first fuel filler pocket portion 24 to the second fuel filler pocket portion 34 without the use of fasteners.

The bottom wall portion 35 of the second fuel filler pocket portion 34 also includes upstanding fingers 38 which are sized and shaped for snap-fitted engagement with the bottom wall apertures 33 on the first fuel filler pocket portion 24 to further connect the first fuel filler pocket portion 24 to the second fuel filler pocket portion 34 without the use of fasteners and to prevent movement of the first and second fuel filler pocket portions 24, 34 relative to each other. While it will be appreciated that the described mating features on the first and second fuel filler pocket portions 24, 34 preferably do not require fasteners, it will also be appreciated that more conventional fasteners may also be used to provide the mating features. It will be appreciated that the first and second fuel filler pocket portions 24, 34 may be attached to each other in any suitable manner, including but not limited to snap-fit tabs, sliding features, and conventional mechanical fasteners.

The second fuel filler pocket portion 34 also includes a radially outwardly extending upper flange 39 including a hole 40 which is alignable with the corresponding body aperture 18 for connection of the release cable assembly 50 including the second fuel filler pocket portion 34 to the vehicle body structure 15. The side wall portion 36 of the second fuel filler pocket portion 34 also includes a plunger aperture (not shown) through which the plunger mechanism 54 is received to connect the plunger mechanism 54 and release cable 52 to the second fuel filler pocket portion 34 to provide the release cable assembly 50, as described further hereinafter.

The fuel filler pocket assembly 20 also includes the release cable assembly 50 comprised of the release cable 52 including the plunger mechanism 54 and the second fuel filler pocket portion 34 of the fuel filler pocket 22. The plunger mechanism 54 of the release cable 52 moves radially inward and outward and is alignable with the hook aperture 74 in the hook portion 73 of the fuel cover door 70 for capturing and releasing the fuel cover door 70. When the plunger mechanism 54 is in the normal radially inward position, the plunger mechanism 54 is extendible through the hook aperture 74 to hold the fuel cover door 70 in the closed position. When the plunger mechanism 54 is in the depressed position or moved radially outward, the hook portion 73 is released and the fuel cover door 70 is free to open with the assistance of the spring-loaded hinge portion 72. The plunger mechanism 54 may be electronically actuated by the use of a remote button (not shown) located in the passenger compartment of the vehicle 10. However, in the case of a malfunction of the electronic release, the manual release cable 52 is used to release and open the fuel cover door 70. The release cable 52 has an end including the plunger mechanism 54 attached to the fuel filler pocket 22 and an opposite end including a back-up release mechanism 57 which may be identified as such on a tag 62. The back-up release mechanism 57 of the release cable 52 is preferably located in the rearward interior compartment 12 of the vehicle 10.

Although the release cable assembly 50 is shown and described as the back-up fuel cover door release when the remote electronic release is not working, it will be appreciated that alternately the electronic release could be eliminated and that the release cable 52 could provide the primary release for the fuel cover door 70. In this case, the release mechanism 57 would be mounted in the more accessible passenger compartment of the vehicle 10, such as on the instrument panel or floor.

The fuel filler pocket assembly 20 is preferably assembled as follows. The release cable assembly 50 is provided which includes the release cable 52 and the second fuel filler pocket portion 34 of the fuel filler pocket 22. Advantageously, the release cable assembly 50 is preassembled prior to vehicle assembly as a unit. Thus, the plunger mechanism 54 is easily inserted through the plunger aperture in the second fuel filler pocket portion 34 of the fuel filler pocket 22 and attached thereto via nut 42. Furthermore, attachment of the plunger mechanism 54 and release cable 52 to the fuel filler pocket 22 can be accomplished with a single operator and entirely separate from the vehicle assembly location. Also, attachment of the release cable 52 and the plunger mechanism 54 to the second fuel filler pocket portion 34 of the fuel filler pocket 22 is accomplished without having a second operator underneath or inside of the vehicle.

The release cable assembly 50 is then attached to the vehicle body structure 15. The release cable 52 is preferably fed in through the access opening 16 and the second fuel filler pocket portion 34 is inserted into the access opening 16. The hole 40 in the upper flange 39 is aligned with the corresponding body aperture 18 in the body flange portion 17 and the corresponding reinforcement tab 75 and attached thereto via one of the fasteners 30. The end of the release cable 52 having the release mechanism 57 and the tag 62 can then be easily routed from behind the vehicle body structure 15 and into the rearward interior compartment 12 for attachment to the vehicle 10, preferably prior to completion of the interior trim for ease of assembly.

Figure 3:
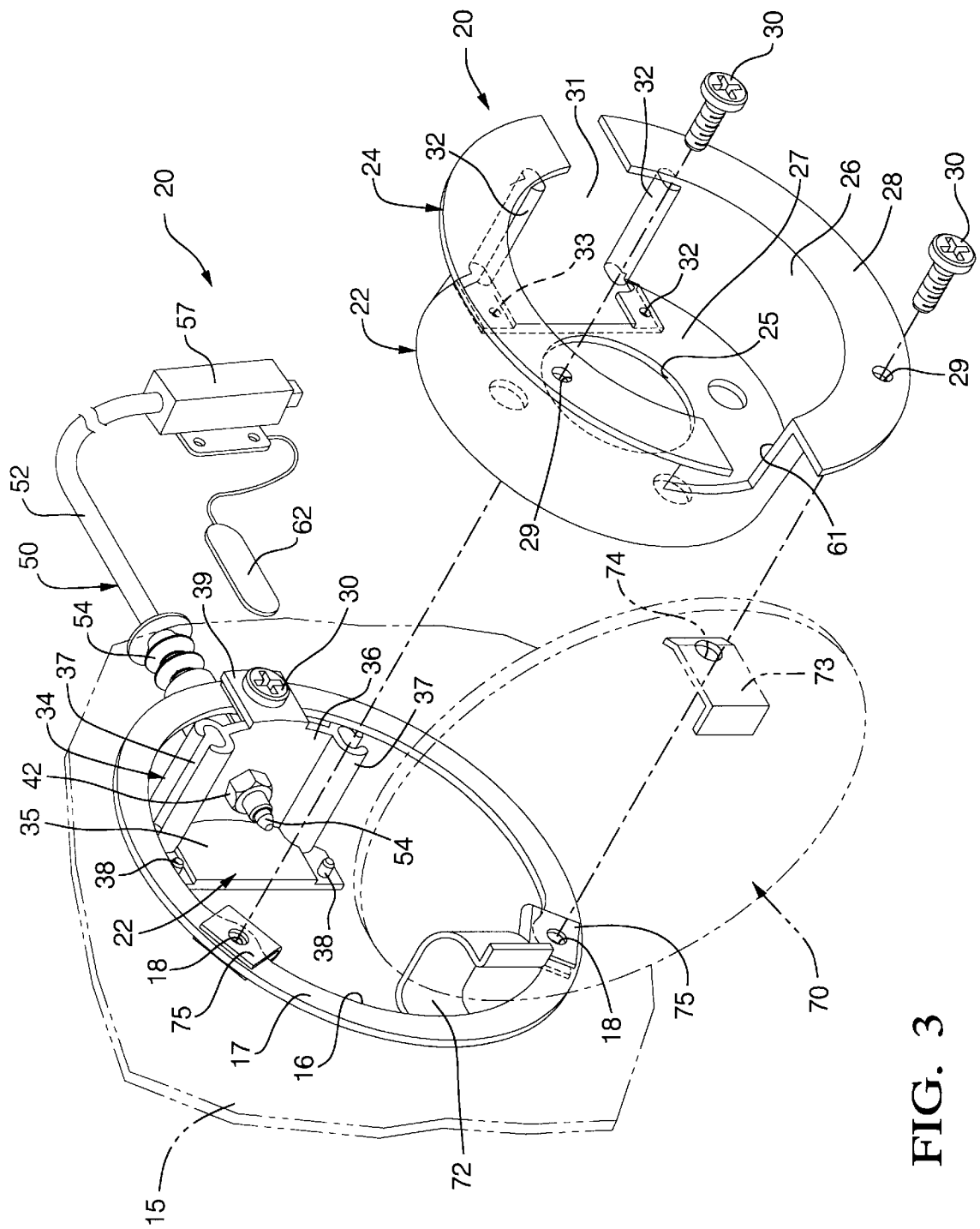
FIG. 3 is a perspective view similar to FIG. 2, but with the fuel filler pocket assembly in a partially assembled condition.
Figure 4:
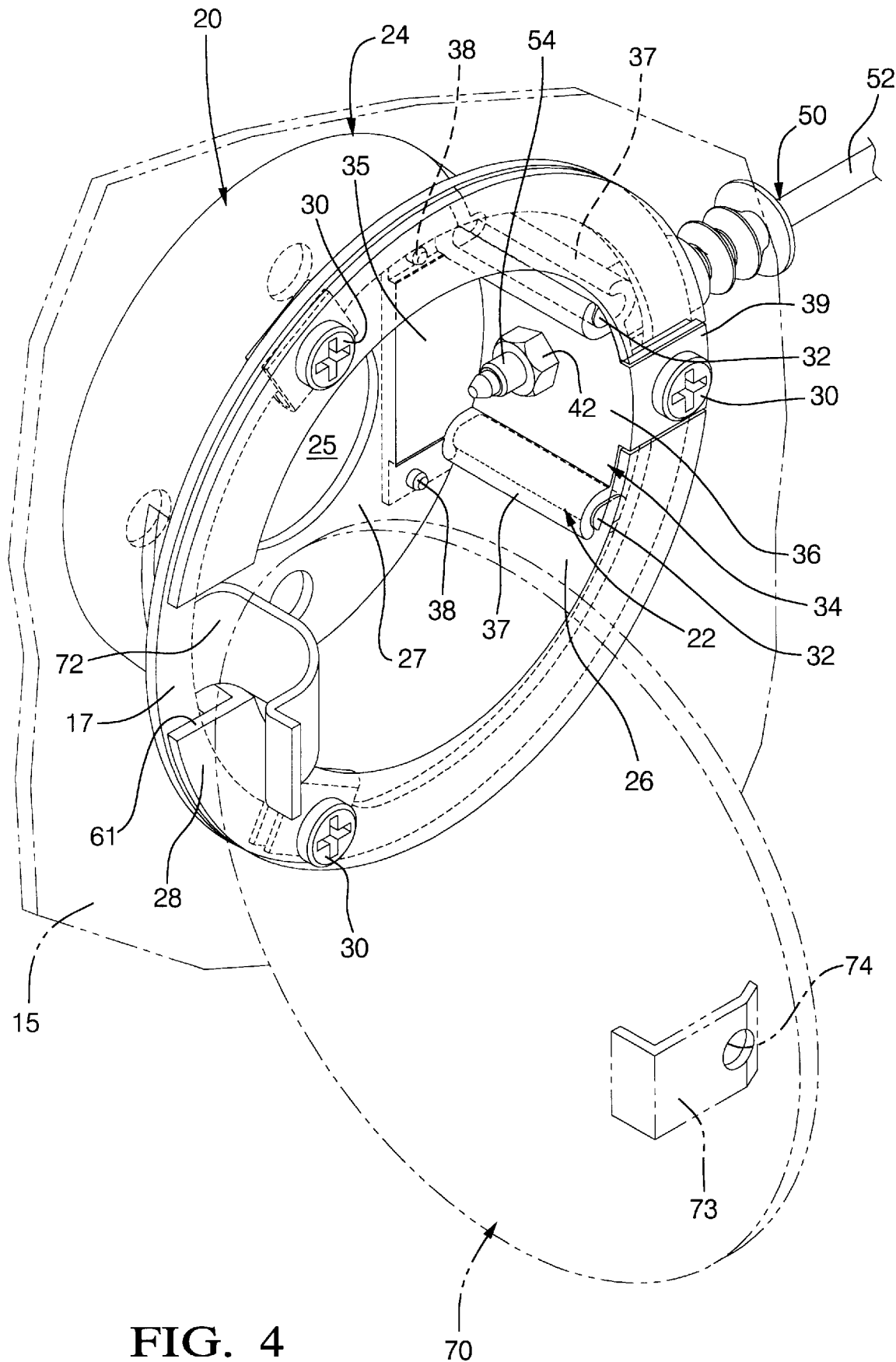
FIG. 4 is a perspective view similar to FIG. 4, but with the fuel filler pocket assembly in the fully assembled condition.

As best shown in FIGS. 3 and 4, to complete the fuel filler pocket assembly 20, the enlarged edge portions 32 of the first fuel filler pocket portion 24 of the fuel filler pocket 22 are axially aligned with the channels 37 on the second fuel filler pocket portion 34. The first fuel filler pocket portion 24 is slidably inserted into the second fuel filler pocket portion 34 such that the edge portions 32 slidably engage and fill the channels 37. Simultaneously, the bottom wall apertures 33 on the first fuel filler pocket portion 24 are aligned with and snap-fittedly engage the fingers 38 on the bottom wall portion 35 of the second fuel filler pocket portion 34. Engagement of the side wall mating features being the edge portions 32 and the channels 37 along with the bottom wall mating features being the bottom wall apertures 33 and the fingers 38 provide interconnection and engagement of the first and second fuel filler pocket portions 24, 34 to each other without the use of fasteners. Advantageously, the first and second fuel filler pocket portions 24, 34 cooperatively provide the fuel filler pocket 22. It will be appreciated that the first fuel filler pocket portion 34 can be easily interconnected to the second fuel filler pocket portion 34 entirely from the exterior of the vehicle. As the first fuel filler pocket portion 24 is connected to the second fuel filler pocket portion 34, the pocket flange apertures 29 on the first fuel filler pocket portion 24 are matably aligned with the corresponding body apertures 18 on the body flange portion 17 and the reinforcement tabs 75. As best shown in FIG. 4, the fasteners 30 may be used to securely connect the first fuel filler pocket portion 24 to the vehicle body structure 15 to complete the fuel filler pocket assembly 20.

It will be appreciated that in the assembled condition, the second fuel filler pocket portion 34 substantially fills the gap pocket portion 31 of the first fuel filler pocket portion 24 to complete the fuel filler pocket 22. It will further be appreciated that the bottom wall portion 35 of the second fuel filler pocket portion 34 is shaped to complete the bottom wall 27 of the first fuel filler pocket portion 24 and the side wall portion 36 is shaped to complete the side wall 26 of the first fuel filler pocket portion 24. Thus, the first and second fuel filler pocket portions 24, 34 complement each other to provide a complete fuel filler pocket 22. After completion of the fuel filler pocket assembly 20, the fuel filler neck may later be inserted into the filler neck opening 25 on the bottom wall 27 and attached to the structure of the fuel filler pocket 22 via the filler neck apertures 60 and appropriate fasteners (not shown). It will be appreciated that the fuel filler pocket 22 serves as support and as a housing for the fuel filler neck.

Advantageously, the fuel filler pocket assembly 20 having a release cable assembly 50 attached to the second fuel filler pocket portion 34 prior to attachment of the first fuel filler pocket portion 24 provides an easy assembly arrangement that greatly reduces the amount of assembly time. In addition, the attachment of the plunger mechanism 54 to the second fuel filler pocket portion 34 of the fuel filler pocket 22 greatly improves the accessibility and ease of this attachment during assembly. In addition, the first fuel filler pocket portion 24 is easily interconnected to the second fuel filler pocket portion 34 from the outside of the vehicle, preferably without the use of fasteners.

It will be understood that a person skilled in the art may make modifications to the preferred embodiment shown herein within the scope and intent of the claims. For example, although the preferred embodiment shows the plunger mechanism 54 and the release cable 52 being assembled to the second fuel filler pocket portion 34 of the fuel filler pocket 22 prior to attachment of the second fuel filler pocket portion 34 to the vehicle body structure 15, it will be appreciated that alternately the second fuel filler pocket portion 34 could be connected to the vehicle body portion 15 and then the plunger mechanism 54 could be attached to the second fuel filler pocket portion 34. Since the second fuel filler pocket portion 34 is only a minor piece of the fuel filler pocket 22, the second fuel filler pocket portion 34 can easily be reached behind by the operator to attach the plunger mechanism 54 to the second fuel filler pocket portion 34 from the outside of the vehicle 10 to complete the release cable assembly 50 prior to attachment of the first fuel filler pocket portion 24 to the second fuel filler pocket portion 34 to provide the fuel filler pocket 22. It will further be appreciated that the release cable assembly 50 may alternately be initially provided in the rearward interior compartment 12 of the vehicle 10 and then the relatively small second fuel filler pocket portion 34 with the plunger mechanism 54 and the release cable 52 attached thereto may be fished upward from behind the vehicle body structure 15 and then the second fuel filler pocket portion 34 can be attached to the vehicle body structure 15 at the body flange portion 17 from the outside of the vehicle 10. Then, the first fuel filler pocket portion 24 can be attached to the second fuel filler pocket portion 34 from the outside of the vehicle 10 to complete the fuel filler pocket 22 and the fuel filler pocket assembly 20.

It will further be appreciated that although the second fuel filler pocket portion 24 attached to the release cable assembly 50 is most preferably shown as a minor portion of the fuel filler pocket 22 and substantially smaller than the major first fuel filler pocket portion 24, it will be appreciated that the proportions may vary between the first and second fuel filler pocket portions 24, 34. It will further be appreciated that although the mating features on the first and second fuel filler pocket portions 24, 34 are shown as enlarged edge portions 32 mating with channels 37 and fingers 38 mating with bottom wall apertures 33, it will be appreciated that other slide-fitted or snap-fitted engagement features may be provided to connect the first and second fuel filler pocket portions 24, 34 to each other without the use of fasteners. It will further be appreciated that although the first and second fuel filler pocket portions 24, 34 of the fuel filler pocket 22 are shown as attached to the vehicle body structure 15 via fasteners 30, the first and second fuel filler pocket portions 24, 34 may be attached to the vehicle body structure 15 by any suitable fastening methods.

While the present invention has been described as carried out in a specific embodiment thereof, it is not intended to be limited thereby but is intended to cover the invention broadly within the scope and spirit of the appended claims.

What is claimed is:

1. A fuel filler pocket assembly including a fuel filler pocket in a vehicle, the vehicle including a fuel cover door for covering the fuel filler pocket, the fuel filler pocket assembly comprising:

a first fuel filler pocket portion;

a second fuel filler pocket portion for attachment to the vehicle, the second fuel filler pocket portion being formed separate and independent from the first fuel filler pocket portion, the first fuel filler pocket portion being attachable to the second fuel filler pocket portion to provide the fuel filler pocket; and a fuel door release cable attached to the second fuel filler pocket portion; and the first fuel filler pocket portion including a pocket gap portion and the second fuel filler pocket portion being sized and shaped for substantially filling the pocket gap portion when the first fuel filler pocket portion is attached to the second fuel filler pocket portion, and wherein the first fuel filler pocket portion is generally cup-shaped and includes a side wall and a bottom wall and wherein the pocket gap portion partially extends through the side wall and partially extends through the bottom wall.

2. The fuel filler pocket assembly of claim 1 wherein the first fuel filler pocket portion forms a major portion of the fuel filler pocket and wherein the second fuel filler pocket portion forms a minor portion of the fuel filler pocket.

3. The fuel filler pocket assembly of claim 1 wherein the second fuel filler pocket portion includes a side wall portion and a bottom wall portion which complement and fill the pocket gap portion when the first fuel filler pocket portion is connected to the second fuel filler pocket portion.

4. A fuel filler pocket assembly including a fuel filler pocket in a vehicle, the vehicle including a fuel cover door for covering the fuel filler pocket, the fuel filler pocket assembly comprising:

a first fuel filler pocket portion;

a second fuel filler pocket portion for attachment to the vehicle, the second fuel filler pocket portion being formed separate and independent from the first fuel filler pocket portion, the first fuel filler pocket portion being attachable to the second fuel filler pocket portion to provide the fuel filler pocket; and a fuel door release cable attached to the second fuel filler pocket portion;

the first and second fuel filler pocket portions each including mating features for interconnecting the first fuel filler pocket portion to the second fuel filler pocket portion; and wherein one of the mating features is an enlarged edge portion and wherein another of the matins features is a channel which is sized and shaped for slidably receiving the enlarged edge portion therein to interconnect the first and second fuel filler pocket portions.

5. A fuel filler pocket assembly for attachment to a vehicle body including a fuel cover door for covering the fuel filler pocket assembly, the fuel filler pocket assembly comprising:

a first fuel filler pocket portion;

a fuel door release cable assembly including a release cable and a second fuel filler pocket portion, the release cable being connected to the second fuel filler pocket portion, the second fuel filler pocket portion for attachment to the vehicle body; and the first fuel filler pocket portion for attachment to the second fuel filler pocket portion and to the vehicle body;

whereby interconnection of the first and second fuel filler pocket portions provides a fuel filler pocket; and the first fuel filler pocket portion including a pocket gap portion and the second fuel filler pocket portion being sized and shaped for substantially filling the pocket gap portion when the first fuel filler pocket portion is attached to the second fuel filler pocket portion, and wherein the first fuel filler pocket portion is generally cup-shaped and includes a side wall and a bottom wall and wherein the pocket gap portion partially extends through the side wall and partially extends through the bottom wall.

6. The fuel filler pocket assembly of claim 5 wherein the first fuel filler pocket portion is formed separate and independent from the second fuel filler pocket portion and wherein the first fuel filler pocket portion and the second fuel filler pocket portion cooperatively provide the fuel filler pocket when connected to each other.

7. The fuel filler pocket assembly of claim 5 wherein the first fuel filler pocket portion forms a major portion of the fuel filler pocket and wherein the second fuel filler pocket portion forms a minor portion of the fuel filler pocket.

8. The fuel filler pocket assembly of claim 5 wherein the second fuel filler pocket portion includes a side wall portion and a bottom wall portion which complement and fill the pocket gap portion when the first fuel filler pocket portion is connected to the second fuel filler pocket portion.

9. The fuel filler pocket assembly of claim 5 wherein the first and second fuel filler pocket portions each include mating features for f interconnecting the first fuel filler pocket portion to the second fuel filler pocket portion.

10. The fuel filler pocket assembly of claim 9 wherein one of the mating features is an enlarged edge portion and wherein another of the mating features is a channel which is sized and shaped for slidably receiving the enlarged edge portion therein to interconnect the first and second fuel filler pocket portions.

11. The fuel filler pocket assembly of claim 10 wherein the first fuel filler pocket portion includes a side wall and wherein the second fuel filler pocket portion includes a side wall portion and wherein the enlarged edge portion and the channel are each located on one of the side wall and the side wall portion.

12. The fuel filler pocket assembly of claim 9 wherein one of the mating features is an aperture and wherein another of the mating features is an upstanding finger for insertion through the aperture to interconnect the first and second fuel filler pocket portions by snap-fitted connection.

13. A method of assembling a fuel filler pocket assembly in a vehicle body comprising the steps of:

a) providing a first fuel filler pocket portion;

b) providing a release cable assembly including a release cable connected to a second fuel filler pocket portion;

c) attaching the second fuel filler pocket portion to the vehicle body;

d) attaching the first fuel filler pocket portion to the second fuel filler pocket portion;

e) attaching the first fuel filler pocket portion to the vehicle body after attaching the first fuel filler pocket portion to the second fuel filler pocket portion.

* * * * *